United States Patent
Tumpic et al.

(10) Patent No.: US 11,789,982 B2
(45) Date of Patent: Oct. 17, 2023

(54) ORDER INDEPENDENT DATA CATEGORIZATION, INDICATION, AND REMEDIATION ACROSS REALTIME DATASETS OF LIVE SERVICE ENVIRONMENTS

(71) Applicant: Electronic Arts Inc., Redwood City, CA (US)

(72) Inventors: Denis Tumpic, Stratford (CA); Brian Schafer, Austin, TX (US); James Nix, Liberty Hill, TX (US); Shina Aofolaju, Austin, TX (US); Jesse Campbell, Maple Valley, WA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 242 days.

(21) Appl. No.: 17/029,524

(22) Filed: Sep. 23, 2020

(65) Prior Publication Data

US 2022/0092086 A1 Mar. 24, 2022

(51) Int. Cl.
*G06F 16/28* (2019.01)
*G06F 16/2458* (2019.01)
(Continued)

(52) U.S. Cl.
CPC ........ *G06F 16/285* (2019.01); *G06F 16/2255* (2019.01); *G06F 16/2468* (2019.01); *G06N 7/023* (2013.01)

(58) Field of Classification Search
CPC .............. G06F 16/285; G06F 16/2255; G06F 16/2468; G06N 7/023
(Continued)

(56) References Cited

U.S. PATENT DOCUMENTS 9,961,202 B2 * 5/2018 Bellosi ............... H04M 3/5175
10,778,707 B1 * 9/2020 Rastogi ............ G06F 16/24568
(Continued)

FOREIGN PATENT DOCUMENTS

CN 102426599 A * 4/2012
CN 103761221 A * 4/2014
(Continued)

OTHER PUBLICATIONS

Github, "ssdeep Project | ssdeep—Fuzzy hashing program," Retrieved from: https://ssdeep-project.github.io/ssdeep/index.html, dated Apr. 11, 2018.
(Continued)

*Primary Examiner* — Phuong Thao Cao
(74) *Attorney, Agent, or Firm* — Gray Ice Higdon

(57) ABSTRACT

A computer-implemented method is provided of finding one or more data items that match one or more defined criteria in a dataset. The method comprises identifying data snippets of the dataset using a set of one or more attention rules; categorizing the identified data snippets using fuzzy matching by assigning them to buckets such that each bucket contains data snippets that are similar to another according to a similarity measure; classifying buckets containing data snippets having more than a threshold number of the true positive data items as true positive buckets and remaining buckets as false positive buckets; calculating culling rules based on the true positive buckets and the false positive buckets, and using the culling rules to remove the false positive data items from the true positive buckets.

19 Claims, 8 Drawing Sheets

(51) Int. Cl.
*G06N 7/02* (2006.01)
*G06F 16/22* (2019.01)

(58) Field of Classification Search
USPC .......................................................... 707/740
See application file for complete search history.

(56) References Cited

U.S. PATENT DOCUMENTS

| | | | | |
|---|---|---|---|---|
| 11,165,675 | B1* | 11/2021 | Piet | G06K 9/6278 |
| 2002/0184181 | A1* | 12/2002 | Agarwal | G06F 16/353 |
| 2005/0259854 | A1* | 11/2005 | Arimura | G06T 5/003 |
| | | | | 382/254 |
| 2010/0250497 | A1* | 9/2010 | Redlich | H04L 63/105 |
| | | | | 707/661 |
| 2012/0054161 | A1* | 3/2012 | Fusco | H04L 69/04 |
| | | | | 707/693 |
| 2013/0016110 | A1* | 1/2013 | Arvo | G06F 9/4881 |
| | | | | 345/522 |
| 2013/0304742 | A1* | 11/2013 | Roman | H04L 51/212 |
| | | | | 707/740 |
| 2014/0337272 | A1* | 11/2014 | Cox | G06N 5/025 |
| | | | | 706/47 |
| 2015/0199224 | A1* | 7/2015 | Mihnev | H04L 41/16 |
| | | | | 714/37 |
| 2017/0070523 | A1* | 3/2017 | Bailey | G06F 16/9535 |
| 2017/0195353 | A1* | 7/2017 | Taylor | G06F 12/0813 |
| 2018/0012082 | A1* | 1/2018 | Satazoda | G06F 18/24 |
| 2018/0232528 | A1* | 8/2018 | Williamson | G06N 5/025 |
| 2018/0232900 | A1* | 8/2018 | Kraft | G06F 18/2415 |
| 2019/0236102 | A1* | 8/2019 | Wade | G06F 16/901 |
| 2019/0243841 | A1* | 8/2019 | Hoffmann | G06F 40/186 |
| 2019/0311229 | A1* | 10/2019 | Qian | G06F 18/41 |
| 2020/0067861 | A1* | 2/2020 | Leddy | G06F 21/6245 |
| 2020/0073959 | A1* | 3/2020 | Tian | G06F 16/152 |
| 2021/0120034 | A1* | 4/2021 | Starov | G06F 16/951 |
| 2021/0173874 | A1* | 6/2021 | Giddings | G06F 16/3322 |
| 2021/0232615 | A1* | 7/2021 | Hoffmann | G06F 40/30 |
| 2022/0012672 | A1* | 1/2022 | Inman | G06F 21/32 |

FOREIGN PATENT DOCUMENTS

| | | | | |
|---|---|---|---|---|
| NL | 2011730 A | * | 10/2014 | |
| WO | WO-2019222099 A1 | * | 11/2019 | G06F 21/6254 |

OTHER PUBLICATIONS

Wallace, Brian, "Optimizing SSDEEP for use at Scale," Virus Bulletin, Retrieved from: https://www.virusbulletin.com/uploads/pdf/magazine/2015/vb201511-ssDeep.pdf, dated Nov. 2015.

Digital Forensic Science, "Fuzzy Hashing with SSDEEP (similarity matching)," Retrieved from: https://dfir.science/2017/07/How-To-Fuzzy-Hashing-with-SSDEEP-(similarity-matching).html, dated Jul. 18, 2017.

Bryce, Chapin, "Fuzzy Hashing and CTPH," Pythonic Forensics, Retrieved from: https://medium.com/pythonic-forensics/fuzzy-hashing-and-ctph-69f4a7bbfe48, dated Nov. 4, 2018.

Stack Exchange, "What fuzzy hashing algorithms exist?," Retrieved from: https://security.stackexchange.com/questions/117905/what-fuzzy-hashing-algorithms-exist, dated Mar. 18, 2016.

Pagani, Fabio et al., "Beyond Precision and Recall: Understanding Uses (and Misuses) of Similarity Hashes in Binary Analysis," Retrieved from: http://s3.eurecom.fr/docs/codaspy18_pagani.pdf, dated 2018.

Li, Yuping, et al. "Experimental Study of Fuzzy Hashing in Malware Clustering Analysis," Retrieved from: https://www.usenix.org/system/files/conference/cset15/cset15-li.pdf, dated Aug. 2015.

French, David, "Fuzzy Hashing Techniques in Applied Malware Analysis," Carnegie Mellon University, Retrieved from: https://insights.sei.cmu.edu/sei_blog/2011/03/fuzzy-hashing-techniques-in-applied-malware-analysis.html, dated Mar. 28, 2011.

* cited by examiner

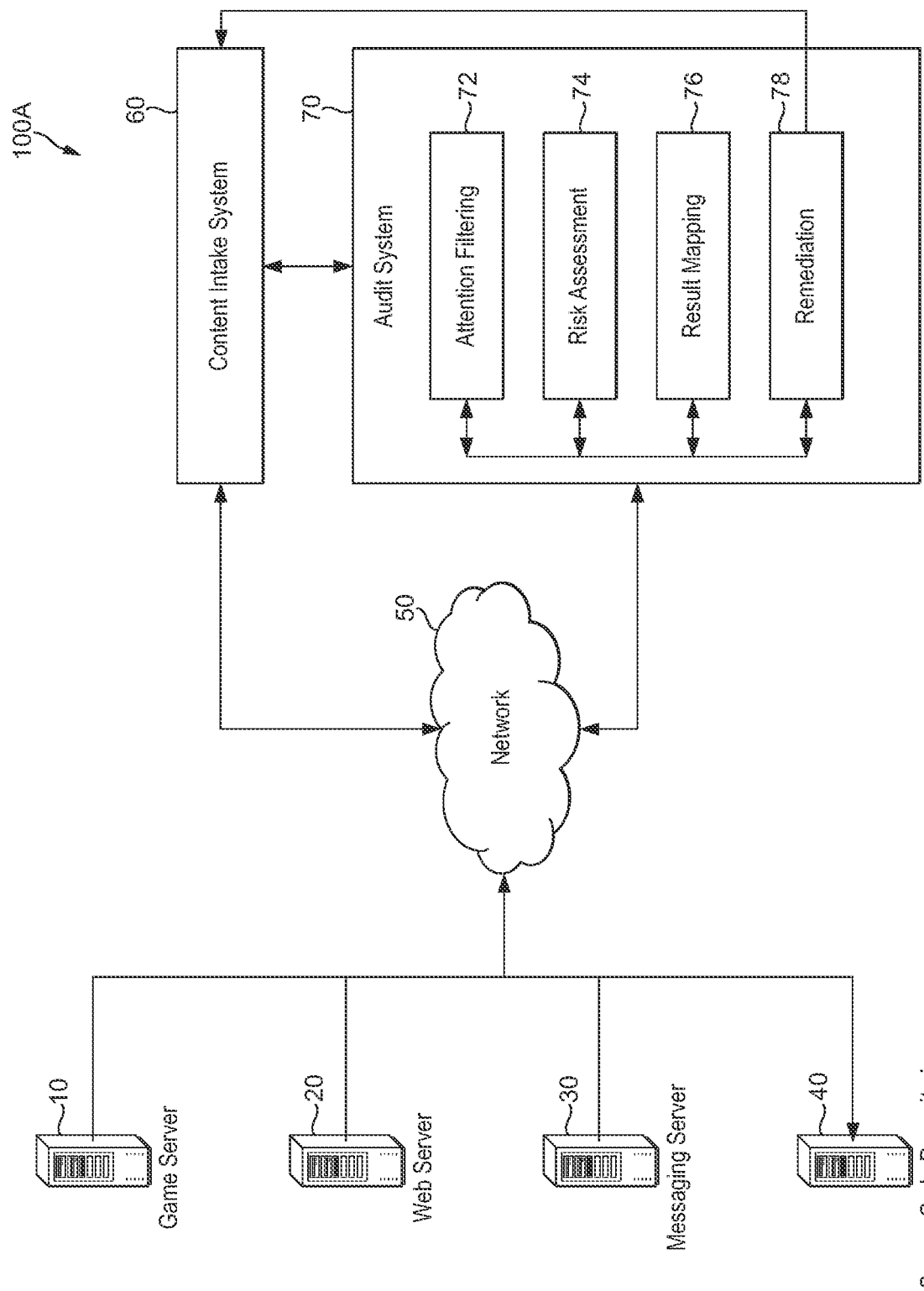

ORDER INDEPENDENT AUDITING OVERVIEW

ATTENTION FILTERING

RISK ASSESMENT

RESULT MAPPING AND REMEDIATION

ORDER INDEPENDENT DATA CATEGORIZATION, INDICATION, AND REMEDIATION ACROSS REALTIME DATASETS OF LIVE SERVICE ENVIRONMENTS

BACKGROUND

Modern live services provide content and connectivity to users. These live services create an environment that is often facilitated through servers and clients. A growing and popular form of live services environments is modern video games. Modern video games are able to expand on experiences provided to players through live services. However, as live services environments for video games grow so does risk of exposing sensitive data.

Naturally, datasets for a live service environment expand with the growth of the live service. This growth of datasets makes the task of identifying sensitive data more difficult over time. The difficulty of this task is further perpetuated by data being heterogenous.

Manually auditing large amounts of heterogeneous data to find sensitive data items, such as passwords or credentials, is time-consuming and cannot be done for gigabytes, terabytes and petabytes of heterogeneous datasets. Conventional automated methods for detecting particular data within large dataset do not adequately detect sensitive data in large heterogeneous datasets since a password, credential, or other sensitive items can be of any variable type (e.g., string, character, integer, and other datatypes of the like) and of any format or length. The inherent inconsistency and secrecy of sensitive data also imposes great difficulty in developing a syntactical and semantic approach for categorization and indication of the sensitive data. As such, it would be advantageous for an automated system to categorize, indicate, and remediate sensitive data within large heterogeneous datasets of live service environments.

SUMMARY

A first exemplary embodiment of the disclosed subject-matter is a computer-implemented method of finding one or more data items in a dataset that match one or more defined criteria. The method comprises identifying data snippets of the dataset using a set of one or more attention rules, wherein each identified data snippet includes either a true positive data item or a false positive data item, wherein a true positive data item is a data item that matches the one or more defined criteria, and a false positive data item is a data item that does not match the one or more defined criteria. The data snippets are categorized using fuzzy matching by assigning them to buckets such that each bucket contains data snippets that are similar to another according to a similarity measure. Buckets containing data snippets having more than a threshold number of the true positive data items are classified as true positive buckets and remaining buckets are classified as false positive buckets. Culling rules are calculated based on the true positive buckets and the false positive buckets. The culling rules are used to remove the false positive data items from the true positive buckets.

A third exemplary embodiment of the disclosed subject-matter is a computer system, comprising one or more processors; one or more computer-readable media having computer-executable instructions stored on the one or more processors. The one or more computer-executable instructions are configured to cause the one or more processors to perform a method of finding one or more data items in a dataset that match one or more defined criteria. The method comprises identifying data snippets of the dataset using a set of one or more attention rules, wherein each identified data snippet includes either a true positive data item or a false positive data item, wherein a true positive data item is a data item that matches the one or more defined criteria, and a false positive data item is a data item that does not match the one or more defined criteria. The identified data snippets are categorized using fuzzy matching by assigning them to buckets such that each bucket contains data snippets that are similar according to a similarity measure. Buckets containing data snippets having more than a threshold number of the true positive data items are classified as true positive buckets and remaining buckets are classified as false positive buckets. Culling rules are calculated based on the true positive buckets and the false positive buckets. The culling rules are used to remove the false positive data items from the true positive buckets.

BRIEF DESCRIPTION OF THE DRAWINGS

FIG. 1A is a system for auditing content for sensitive data.

Figure 1B:
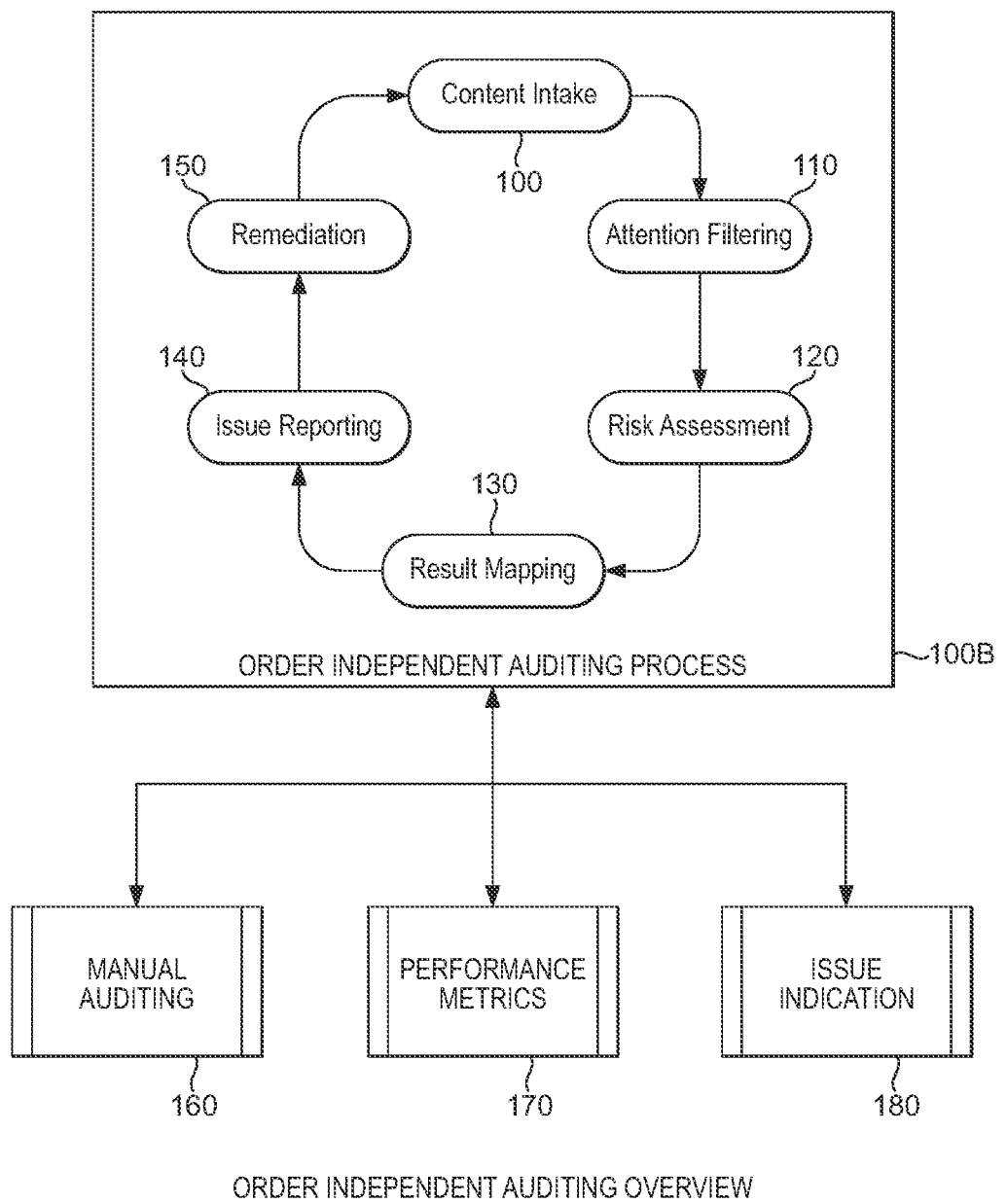
FIG. 1B is a block diagram illustrating an overview of an auditing process.

Although some figures show certain procedural steps in a particular order, those skilled in the art will appreciate that some steps may be performed in a different order than that shown and/or some steps may be performed in parallel.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based system that perform the specified functions or acts, or combinations of special purpose hardware and computer instructions.

DETAILED DESCRIPTION

The present disclosure relates to a computer-implemented system and method for order independent categorization, identification, and remediation of sensitive data within large heterogeneous datasets of live services environments by matching against indicators of sensitive data. By focusing on matching against indicators of sensitive data, rather than matching against the sensitive data itself, instances of sensitive data within a large heterogeneous data are more efficiently and accurately discoverable and identifiable.

General Definitions

The following terms are defined to aid the present disclosure and not limit the scope thereof.

A "user" or "player," as used in some embodiments herein, refers to an individual and/or the computing system(s) or device(s) corresponding to (e.g., associated with, operated by) that individual.

A "client," as used in some embodiments described herein, is a software application with which a user interacts, and which can be executed on a computing system or device locally, remotely, or over a cloud service.

A "live service," as used in some embodiments described herein, is an online service that provides supplemental interactivity to a client, such as, but not limited to, providing additional content, software updates, or interconnectivity between users' computing devices. A live service is often hosted on one or more servers.

A "live service environment," as used in some embodiments described herein, is the networked ecosystem between a client, the client's live services, and the client's user base (e.g., the computing devices corresponding to the user base).

A "video game," as used in some embodiments described herein, is a client that provides a virtual interactive environment with which players engage. A live service of a video game can provide additional content for players to engage with and interconnectivity between players for facilitating multiplayer functionality. The live service environment of a video game is referred to in some embodiments herein as a "video game environment".

A "heterogeneous dataset," as used in some embodiments described herein, is a dataset with unique data entries characterized in that they are inconsistent and lack readily identifiable uniformity.

A "real-time dataset," as used in some embodiments described herein is a dataset with continuous, routine, or periodic growth. One skilled in the art would recognize that live services environments inherently have or generate real-time datasets.

"Content," as used in some embodiments described herein refers to the data of or forming a dataset. "Content intake" is the process of acquiring data from a dataset. In some embodiments, the content of a real-time dataset of a live service environment is non-binary.

"Order independent," as used in some embodiments described herein means concurrency with respect to computing processes. One skilled in the art would recognize that concurrency means that a collection of independent processes can be performed in any order to achieve the same outcome.

The term "attention rule" or "attention filter", as used herein in some embodiments, refers to an opportunistic rule that takes in a large amount of true positive data items with the caveat that it also takes in some false positive data items. An attention rule is a rule that directs the method's attention to one or more data snippets that contain a data item. The attention rule is designed in such a way that it over identifies snippets containing a data item rather than under identifying snippets. If only such attention rules (without any culling rules) were used, a recall rate of 100% could be obtained, while the precision rate would only amount to 10%, which would overwhelm the user with false positive data items. In some of the embodiments, where attention rules and culling rules are employed, a precision rate of 85% and a recall rate of 98% have been achieved. In other embodiments, a precision rate of 93.37% and a recall rate of 99.95% have been achieved. Precision is the fraction of retrieved true positive data items among all retrieved data items, while recall is the fraction of retrieved true positive data items among all true positive data items.

As described herein, a dataset includes a variety of data snippets. A dataset can be of any size, including as described in some example embodiments herein gigabytes and terabytes of data. A data snippet has a length larger than a data item such that it additionally contains context of or relating to the data item. Categorizing data snippets includes defining attention rules to identify data snippets of the dataset that are likely to contain data items that match the one or more defined criteria. Thus, the attention rules identify data snippets of the dataset that include either a true positive data item or a false positive data item—a true positive data item being a data item that matches the one or more defined criteria and a false positive data item is a data item that is caught by the attention rules but does not match the one or more defined criteria. Hence, the attention rules are "opportunistic" in that in addition to finding data snippets that contain data items that match the defined criteria ("true positives"), they also find data snippets that contain data items that do not match the defined criteria ("false positives").

A defined criterion may be configured such that data items may be found which include sensitive information (e.g., credentials or passwords). It will be understood that criteria may be set at different levels of generality. For example, in some cases data items can be of a particular type (e.g., passwords). In some embodiments, the one or more defined criteria may be relative to a specific industry or field (e.g. video games) and may be an evolving criterion.

Data snippets among the dataset are identified using the attention rules. The identified data snippets are categorized using fuzzy matching by assigning them to buckets such that each bucket contains data snippets that are similar to one another according to a similarity measure. Buckets containing data snippets having more than a threshold number of the true positive data items are classified as true positive buckets and other or remaining buckets are classified as false positive buckets.

Culling rules are used to remove the false positive data items from the true positive buckets. Culling rules are calculated based on the true positive buckets and the false positive buckets. The process of culling using culling rules in order to remove false positive data items from the true positive buckets can be repeated with or for new or other data snippets of the dataset. In some of the embodiments, the one or more true positive data items that have been found are protected, e.g. by means of cryptograph, to increase their security.

It should be understood that one or more of the steps or processes described herein can be repeated until, for example, a predetermined stop criterion is fulfilled or a certain percentage of data snippets with data items have been correctly assigned to true positive buckets.

Various implementations use the context (e.g., features) of sensitive data items (e.g., passwords), since passwords are often found in the vicinity of other similar or homologue features. That is, the context of the data item is defined by features in the vicinity of the data item. The term "homologue" as used in some embodiments herein describes something that has a similar position, structure, value or purpose to something else (e.g., data snippets in the same buckets are homologous). For example, in expressions such as passwd="qwerty" or password=$wery$ or passwd:=<4567> or PASSWORD=§ uikg§ or PWD="Iamthebestprogrammerintheworld", the password is different each time, but the features around it are similar each time. In other words, while the password can be anything in terms of syntax and semantic meaning, the context in which such passwords appear can often be similar or identical. Therefore, it should be noted that in some embodiments, the data item itself can be of less relevance, whereas the context in which the data item appears and the categorization based on those contexts can be of more relevance. For example, a context can distinguish a snippet of source code containing a data item from another snippet of source code not containing a data item. In other words, the invention learns how data items manifest themselves within source code and what the contexts of data items (e.g., features around the data item) are or look like.

Various implementations described herein use fuzzy matching or fuzzy hashing (or context triggered piecewise hashing (CTPH)). to categorize data/data snippets based on their homology. Fuzzy hashes, such as SSDeep, SDHash, Nilsimsa or TLSH (a locality sensitive hash) are able to make categorizations, also referred to as "bucketizations" herein, based on the context. While humans are unable to go through large amounts of data, they can still assess a plurality of buckets and quickly identify whether they contain sensitive text items or not. The reason is that the content in each bucket is quite similar and a user can easily discern by a quick look whether a bucket contains sensitive data items or not. For example, an auditor can immediately recognize whether a bucket contains passwords, which are the data items that are searched for, i.e. true positive data items, or telephone numbers which would be considered to be false positive data items. In other words, by virtue of tool described in the embodiments herein, a manual audit may only need to be performed on the buckets of data rather than on an entire dataset. Moreover, the result from the process may feed back on itself so the tool could constantly improve after each run. The tool can be configured to run during development, before committing changes, and/or throughout the build process and deployment to help maintain a secure development environment by keeping sensitive information secure. The method is self-enhancing and improves over time by using the knowledge of already classified snippets to classify new ones. As more snippets are classified, better and new unknown snippets may be classified.

The aim of fuzzy matching is to find matches to an item that are similar and/or do not exactly match. In the context of the present invention, fuzzy matching is used to bucketize/categorize data snippets such that similar ones end up in the same bucket. Fuzzy matching is used in many search engines and allows, for instance, to return pertinent search results even if there was a typing error in the query. Many algorithms exist that can be used for fuzzy matching (e.g., on text). Many of these are based on the Levenshtein Distance, which is a string metric used for measuring the difference (or similarity) between two strings or portions of data (e.g., data snippets). The Levenshtein distance between two strings is defined as the minimum number of single-character edits (e.g., insertions, deletions, or substitutions) that would have to be performed to change one word into the other. In some embodiments, the Levenshtein distance is used as a similarity measure between two data snippets.

Hashing in general refers to generating a number out of a string using a mathematical function, called a hash function. A hash function h complies with the following conditions: h maps input x of an arbitrary bit length to output h(x) of a fixed bit length. h(x) is also referred to as fingerprint of x. If x and h are given, then h(x) is easily computable, which means in polynomial time depending on the bit length of x. Hashing is used in cryptography and a cryptographically useful hash function is chosen so that the fingerprints cannot be tampered. Well-known cryptographic hash functions or algorithms include SHA-0, SHA-1, SHA-2, SHA-3, SHA-256 and MD5.

Such algorithms can take an input of any size and generate a fixed-length value corresponding to that input. A change of a single bit of the input results in a completely different output. Moreover, given an input and its hash, it is computationally infeasible to find another input that leads to the same hash value. Cryptographic hashing is distinguishable from fuzzy hashing, such as SSDeep which will be discussed in more detail in the following.

Contrary to the embodiments described herein, SSDeep is commonly used on binaries, in the field of digital forensics, and to detect the presence of viruses in a binary. In some embodiments described herein, SSDeep is used on text data which is an unusual and counter-intuitive approach. When SSDeep is applied to data snippets, as in embodiments of the present invention, then snippets that are similar end up in the same bucket. SSDeep creates a hash value that determines a level of similarity between two files. In other words, SSDeep is a fuzzy hashing algorithm which employs a similarity digest in order to determine whether the hashes that represent two files have similarities. If the hashes have similarities, then the original files can be assumed to be similar, too. For example, if a single byte of a file is manipulated, the SSDeep hashes of the original file and the manipulated file will be similar. SSDeep similarity scores range from zero (e.g., no similarity or hardly any similarity) to 100 (e.g., very similar or identical). SSDeep operates by computing a fuzzy hash of each piece of data (string, file, data snippet, etc.) input to it using an operator typically called 'compute'. After hashes for more than one input have been computed, a second operator (often referred to as 'compare') is used to compare the two hashes. In other words, in some of the embodiments, a similarity measure between two snippets is defined by SSDeep, namely the 'compare' operator of SSDeep.

As described herein, fuzzy matching algorithms such as SSDeep may be used to categorize data snippets. This similarity comparison is performed completely independently of the files that the hashes are based on, which enables simple high-level comparisons without having to compare each file bytewise. As mentioned above, fuzzy hashing, such as SSDeep, is different from cryptographic hashing (e.g., SHA-1) because a cryptographic hash can check for exact matches (or non-matches). For example, a cryptographic hash is useful to determine whether two files are identical, while fuzzy hashing can be used, for example, to determine if one file is part of another file. In other embodiments, and as an alternative to SSDeep, SDHash can be used to determine the similarity between data snippets.

System Overview

FIG. 1A is a system diagram illustrating a computing environment 100A for auditing data, including auditing data according to the auditing process 100B illustrated in FIG. 1B. As used herein, the auditing process 100B is or includes order independent categorization, indication, and remediation of data for real-time datasets of live service environments.

The system 100A of FIG. 1A is designed to audit content for sensitive data (e.g. passwords, credentials) and other defined criteria. The system 100A includes a game server 10, a web server 20, a messaging server 30 and source code repositories 40 (also depicted FIG. 2) that are connected via a network 50 with a content intake system 60 and an audit system 70. The content intake system 60 is adapted to take in content that is to be audited from several sources, such as the game server 10, the web server 20, the messaging server 30 or the source code repositories 40. Though, it should be understood that the content intake system 60 can obtain or receive content or data from other source systems known to those of skill in the art and not illustrated in example FIG. 1A. The audit system 70 further includes an attention filtering subsystem 72, a risk assessment subsystem 74, a result mapping subsystem 76 and a remediation subsystem 78. The processes that are performed in the subsystems 72, 74, 76 and 78 will be described in more detail with reference to the following Figures.

An overview of an (order independent) process 100B for auditing content for sensitive data (e.g., passwords, credentials) and other defined criteria, is now provided with reference to FIG. 1B. At step 100, the content to be audited is received. In some embodiments, the content intake step 100 includes receiving, reformatting and partitioning the content. The content may be hosted in various forms either locally or remotely. In turn, at step 110, the content is scanned using attention filters (e.g., attention rules) and calculated culling filters (e.g., culling rules) such that the result set includes a high rate of true positive data items and a high recall rate. At step 120, a risk assessment is performed in which context is extracted when the attention filter finds a match. A risk identifier can also be assigned to the finding (e.g., data snippet containing a data item). At step 130, the findings are mapped to existing findings already in the system. This may include updating existing findings, adding new findings and context to the system, and/or flagging that a finding is no longer present in the system.

In turn, at step 140, an issue reporting process is performed in which the system outputs the findings and differences from previous audits. At step 150, a remediation step is performed in which stakeholders, such as developers, can remediate any problems found. The auditing process can be performed as a cycle so that step 100 is again performed as a next step. The auditing process may be controlled and/or managed via an editing interface 160 that is a Web-User Interface for auditing of findings that the system is not aware of. The process 100B may further be controlled and/or managed via a performance metrics dashboard 170 that keeps track of various metrics with regards to e.g., audit remediation, SLA (service level agreement) adherence, etc. There is further provided an issue indication Web User Interface 180 that integrates findings to indicate issues.

Datasets

The dataset of a video game environment can be a realtime dataset that continuously grows with the live services of a video game. The growth of the dataset is made in part by the development of the live service and the player engagement with the live service. A dataset can include source code, documentation, transcripts or computer chat conversations, or data input in the form of a stream.

Figure 2:
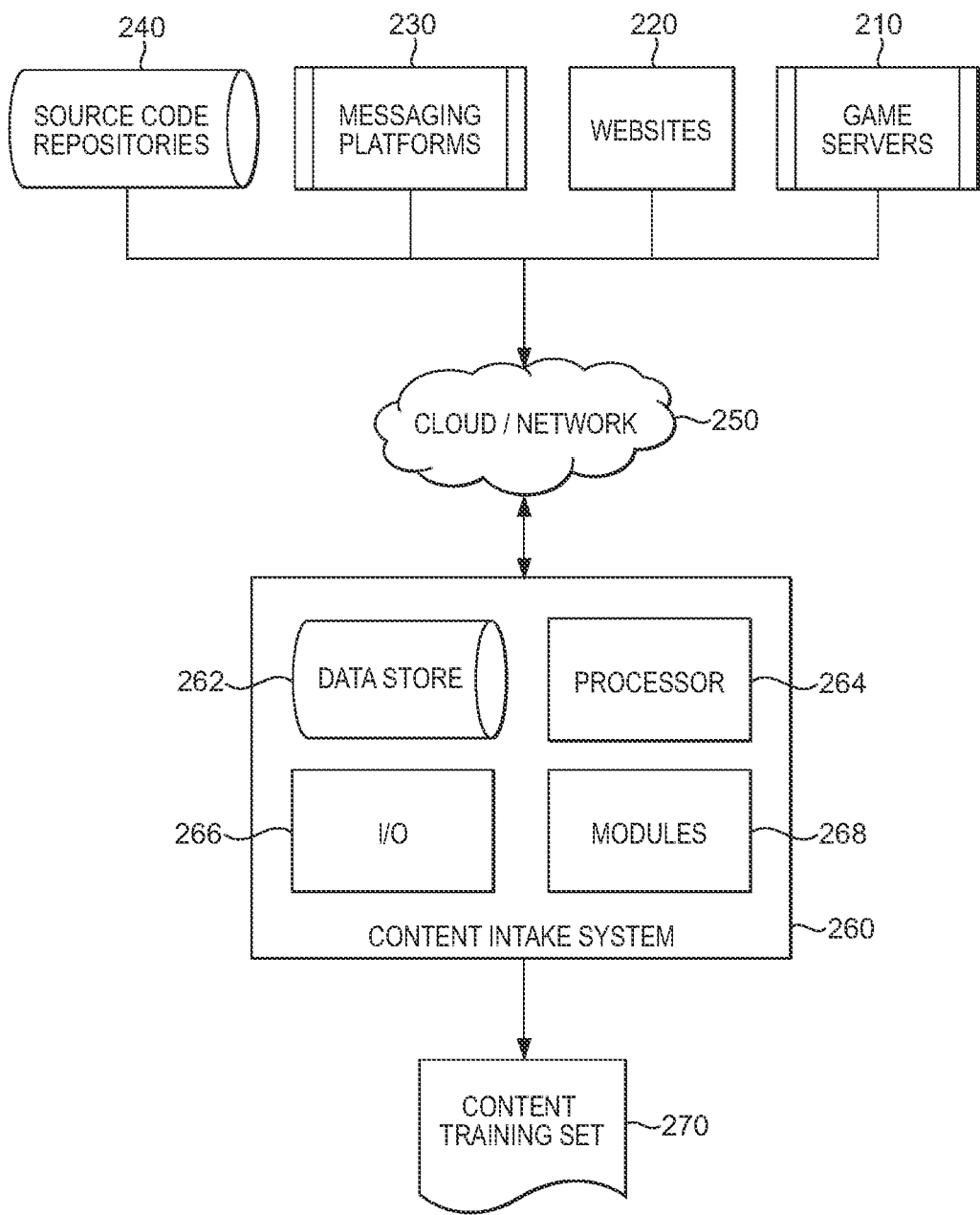
FIG. 2 shows a content intake process.

FIG. 2 shows the content intake process 100 in more detail, according to an example embodiment. As shown at the top of FIG. 2, the content may be any content and may be obtained from different sources. For example, in some embodiments, the content may be provided in the form of paper that is scanned and processed by an Optical Character Recognition (OCR) system that is able to digitalise text content and import it into a computer system. Other examples of content sources include source code repositories 240, messaging platforms 230, websites 220 and game servers 210. The content obtained from these sources is transferred via a cloud/network 250 into a content intake system 260. The content intake system 260 includes a data store 262, a processor 264, an input/output interface 266 and a set of further modules 268. All or portions of the obtained content may be stored in a content training set 270, which may be a part of or separate from the content intake system 260. In some example embodiments, only selected content is stored in the content training set 270, (e.g., in accordance with principles of providing a diversity of data in the training set so as to obtain an adequate coverage and recall rate).

Attention Filtering

Figure 3:
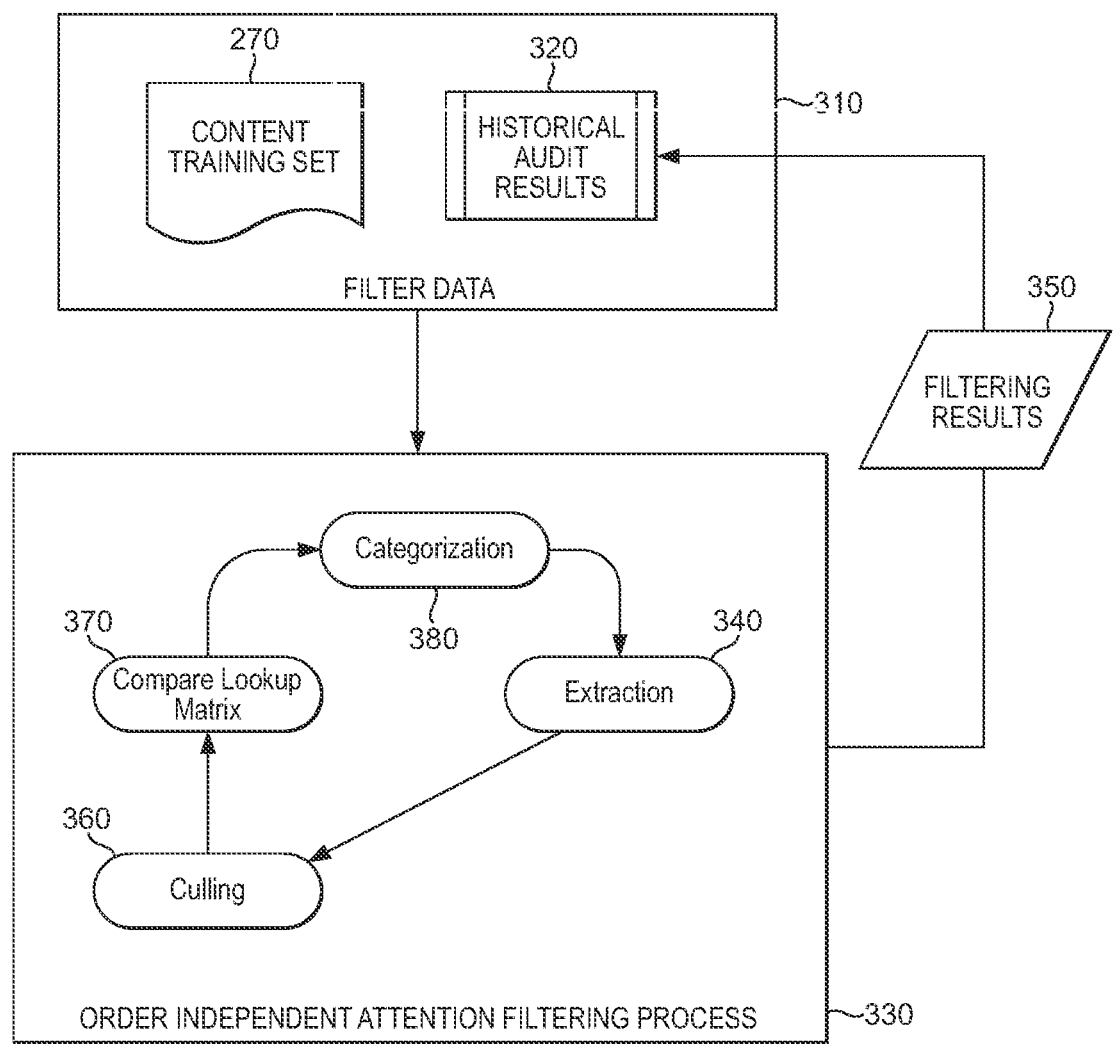
FIG. 3 is a flowchart showing a process of attention filtering and subsequent culling.

FIG. 3 shows an attention filtering process 330, according to an example embodiment. Filter data 310 comprises the content training set 270 and historical audit results 320. Audit results 320 are stored in such a way that they include context for further mapping and clustering of findings such that duplication is minimized and introduction tracing is possible. This filter data 310 is supplied to the attention filtering process 330. At 340, an extraction is performed by using an attention filter based on one or more (primary) regular expressions; the attention filter is an overly opportunistic type of matcher—that is, it attracts more data items than are actually looked for (which means that the output data items may be true positive data items or false positive data items). This maximizes the recall rate as close to 100% as possible. This extraction 340 may be performed using a (primary) regular expression filtering.

At 360, a culling step is performed using a (secondary) regular expression filtering. The culling step ensures that the total number of false positive data items is reduced as much as possible and as precisely as possible (to retain the recall of the attention filter and at the same time enhance the precision). The culling step 360 is used as the attention filters are opportunistic. At 370, context that is available for the findings may be compared with other data items to guide and bias the subsequent categorization step 380. At 380, the data items are categorized into true positive data items and false positive data items. This may be performed automatically or adjusted/added manually. The process then cycles back to the next step of extraction 340. At 350, filtering results are piped back to the historical audit results 320.

Risk Assessment

Figure 4:
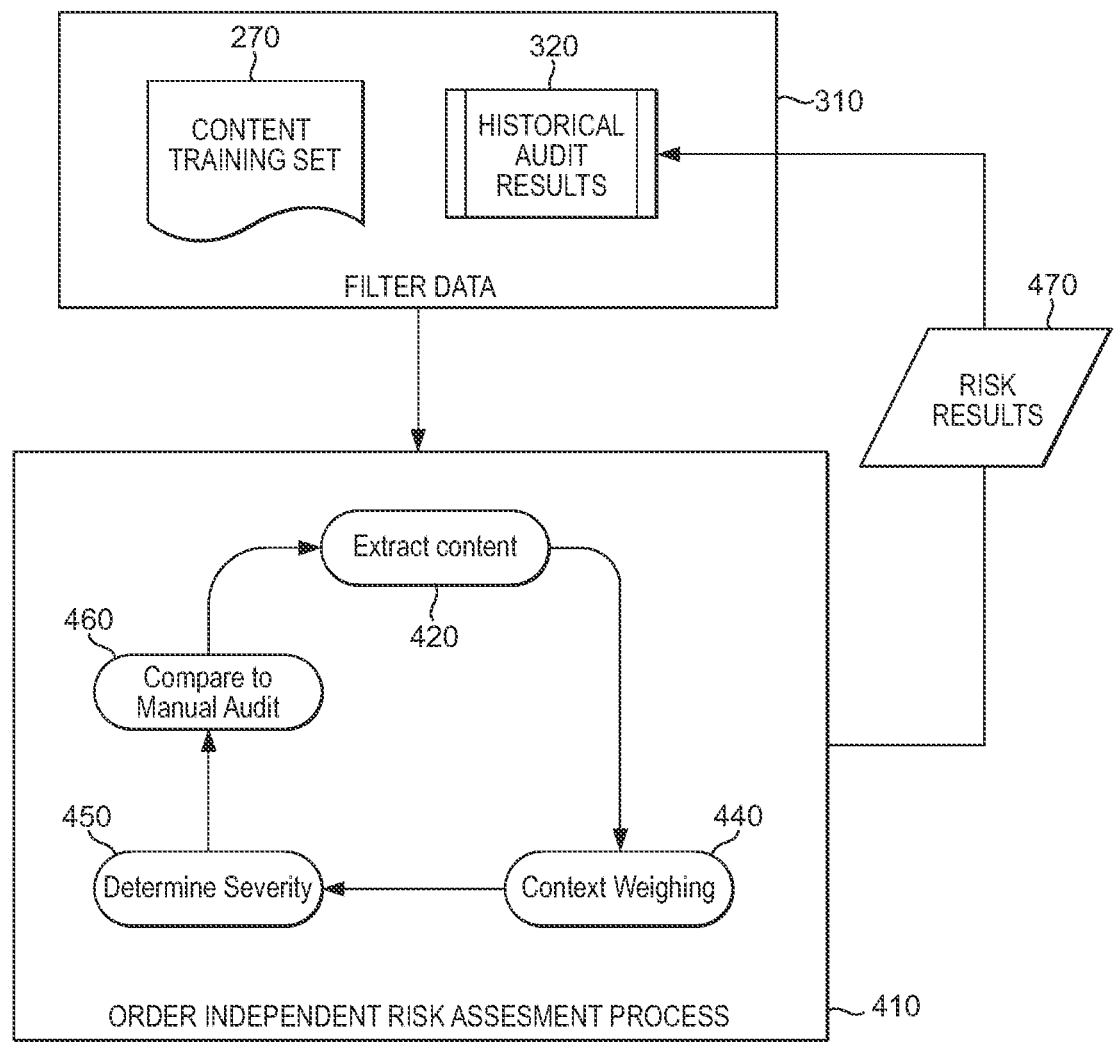
FIG. 4 is a flowchart showing a risk assessment process.

FIG. 4 shows a risk assessment process 410, according to an example embodiment. At 420, context is extracted by means of a risk filter which is implemented as e.g., a regular expression filter (e.g., a multi additive filter to exfiltrate context from the finding). At 440, a context weighing is performed in which a score is calculated for each of a plurality of risk categories based on the risk filter output, optionally weighted based on historical association of similar filter hits. At 450, a severity is determined and the "winner" of the previous calculation is selected unless a lower risk category is a known override. At 460, a comparison is made to a manual audit in which the manual audit has priority (e.g. only new unknown findings will use the calculated risk). When the overall process is run over an extended timeframe, the amount of manually audited findings reduces, i.e. more automatically audited findings exist. After the comparison step 460, the process 410 then cycles back to the step of context extraction 420. At 470, the results of the risk assessment are piped back to the historical audit results 320.

Remediation

Figure 5:
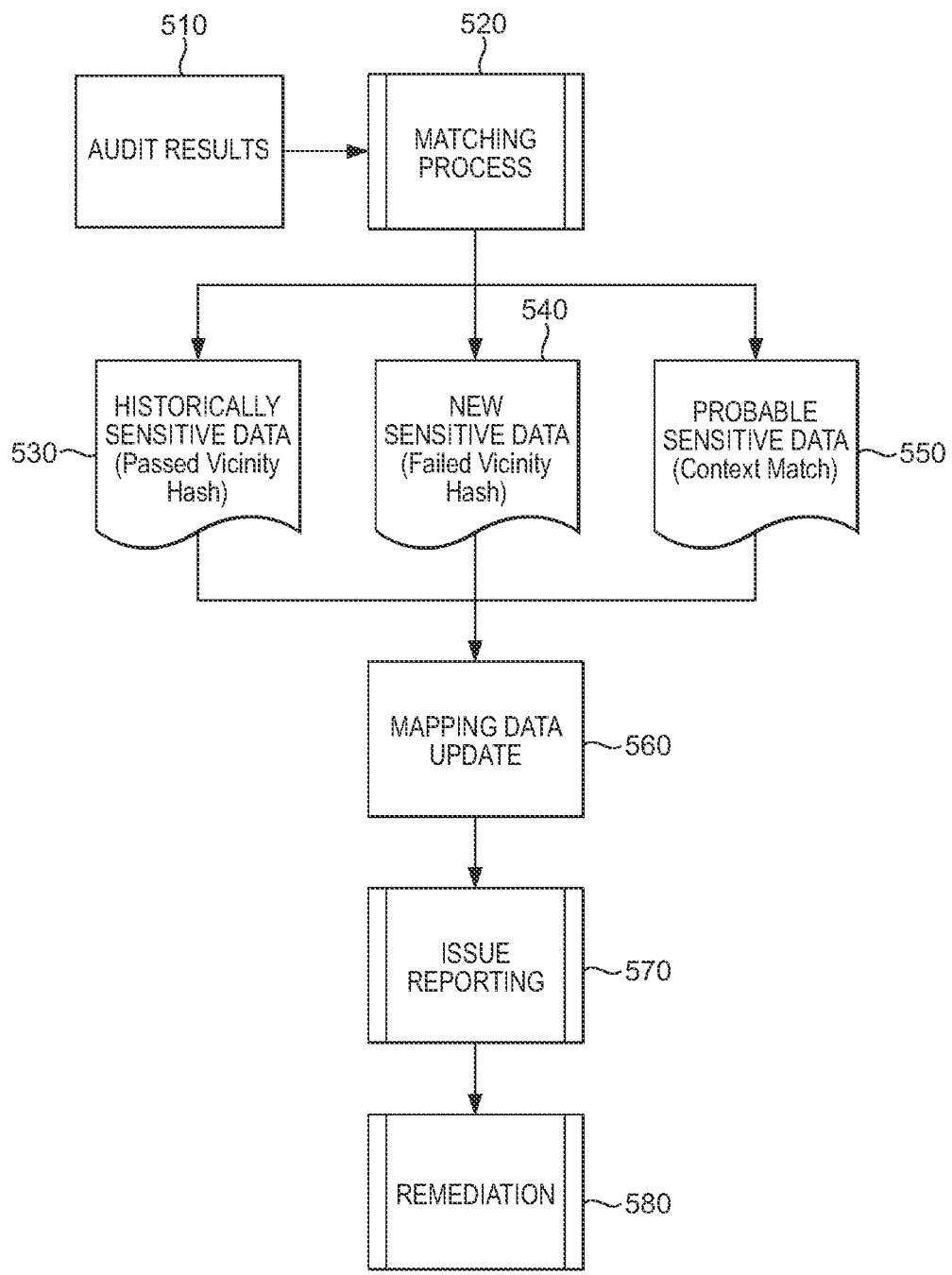
FIG. 5 is a flowchart showing a process of result mapping and remediation.

FIG. 5 shows a process of result mapping and remediation according to an example embodiment. At 510, the audit results which are the current true positive data items from the audit are shown. At 520, the true positive data items are matched against already known data items to minimize duplication. Then, the sensitive data is distributed. At 530, the historically sensitive data is shown which are the hits that are already known (e.g., which passed a vicinity hash). At 540, the new true positive data items are shown which may be determined as those items which failed the vicinity hash. At 550, data is shown for which there is a context match with a known item so that the data is probably already known. At 560, the known body of knowledge is added/updated. At 570, a report about the found data items is sent to the stakeholders. At 580, a remediation is performed in which the stakeholders are enabled to remediate the found data items (in the source code, text, chat . . . ).

Matching

Figure 6:
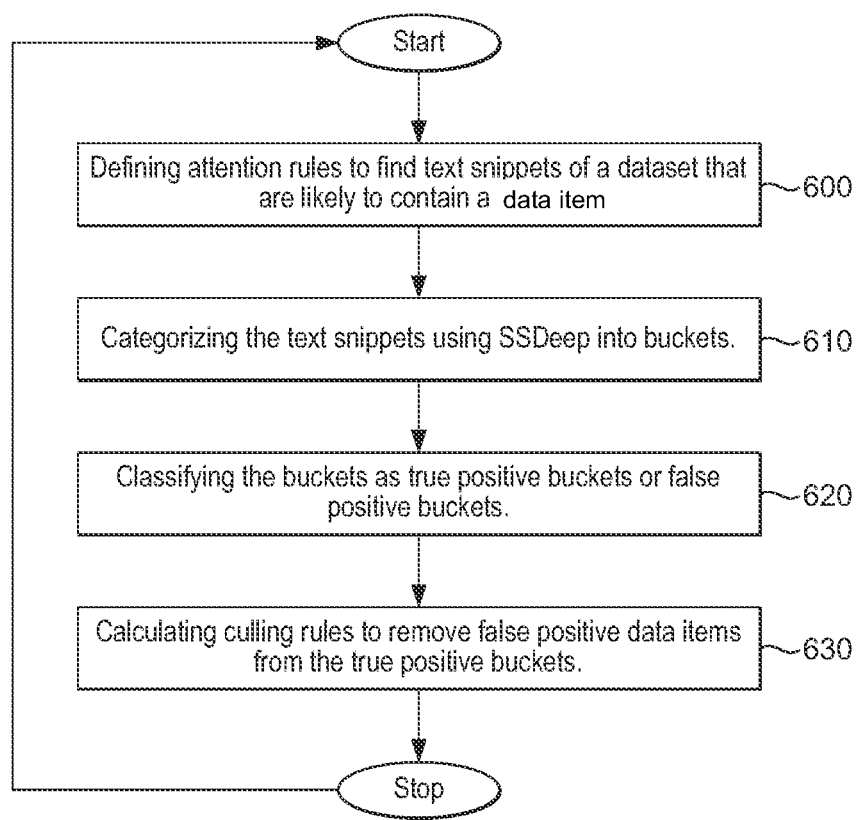
FIG. 6 is a flowchart that illustrates the steps of a method to find a data item that matches one or more defined criteria in a large data set.

FIG. 6 shows a flowchart of an example process that allows a user to find a data item (e.g., passwords) that match a defined criterion in a large dataset. In examples described herein, the dataset can include a large amount of data such as source code, for example stored on a datacentre of or corresponding to a gaming provider. The dataset includes a plurality of data snippets, and a data snippet has a data item and a context of the data item (e.g., features in the vicinity of the data item). At 600, attention rules are defined to find data snippets of the dataset that contain data items. The attention rules are designed to be opportunistic such that they direct the attention to data snippets that include either true positive data items or false positive data items. An attention rule may be any user defined rule that defines the content of a data snippet containing a data item.

At 610, the data snippets that have been found using the attention rules are categorized automatically using fuzzy matching. In some examples, SSDeep is used to categorize the data snippets in different buckets such that all data snippets that are similar are grouped in the same bucket. At 620, the buckets which contain a large portion of data items (and context) are classified as true positive buckets, while the buckets that do not contain data items (and context) are classified as false positive buckets. In some examples, step 620 can be performed automatically and/or manually by a human being (e.g., an auditor). Since all buckets contain similar data snippets, the assessment can be performed quite fast. It is then possible, even for a human being to discern very quickly if a bucket contains for example telephone numbers, street addresses, network connections, etc. or passwords. In other examples, this classification step is performed automatically. At 630, based on this classification of the buckets as true positive and false positive, culling rules are calculated that are used to remove false positive data items from the true positive buckets. In some of the embodiments, the false positive data items are removed using regular expression filtering.

In the exemplary method shown in FIG. 6, the culling rules are calculated using decision tree learning methods. The process is then repeated with new data snippets of the dataset. All found data items (e.g. passwords) can then be protected for instance using cryptographic methods, to increase their security and, in turn, the security of the system that are protected by the data items.

In some of the embodiments, culling rules are calculated in such a way that a recall rate is maximised while also keeping precision rate as high as possible. In some embodiments, the culling rules are assembled/calculated manually, while in other embodiments the culling rules are determined by automatic means (both in a deterministic fashion and well defined process with the up to date already known true positive data items and false positive data items). In some embodiments, the culling rules are calculated using decision tree learning. The culling rules are used to remove false positive data items from the true positive buckets. The method is repeated with new data snippets of the dataset. In some of the embodiments, the method stops when F1= (2*R*P/(R+P))>0.9 where R=Recall rate 0 . . . 1 and P=Precision rate 0 . . . 1. ("F1 score" (also F-score or F-measure) is a measure in statistical analysis of binary classification. It is based on the harmonic mean of the precision and recall.) This translates roughly into a ~1000 force multiplier and makes the system have enough overhead until both R and P need to be heightened again. The culling rules are overfilled with well above 0.9 in F1 score. For some data sets, one can get 0.999+F1 score.

In some embodiments, the culling rules are calculated such that a minimum set of culling rules maximises the amount of culling performed on the buckets classified as false positive buckets. In some embodiments, the culling rules are calculated by calculating the subset of features that are present in all data snippets of buckets that have been classified as false positive buckets but are not present in buckets classified as true positive buckets. In some of the embodiments, the culling rules are designed to be precise in contrast to the opportunistic nature of the attention rules. In some of the embodiments, the culling rules are recalculated at a point of time that is determined using a Fast Fourier Transformation. In some embodiments, culling rules are recalculated at a point of time that is determined by a rate of additional amount of data in comparison to known data size.

In some of the embodiments, the attention rules and culling rules are implemented in the form of regular expression filtering.

An example opportunistic attention rule (e.g., attracting too many rather than too few snippets with true positive and false positive data items) may be represented by the following regular expression:

(>|'|=")([A-Z0-9V+]{22}|[A-Z0-9V+]{27}|[A-Z0-9V+]{38}|[A-Z0-9V+]{43}|[A-Z0-9V+]{65}|[A-Z0-9V+]{86})==(<|'|"|[[:space:]])

This case insensitive regular expression hits on every base64 block that is of various known cryptographically known hash lengths and that are enclosed with known delimiters. This expression will hit on a lot more than what is actually searched for. The [A-Z0-9V+] is A-Z (all upper and lower case letters of the English alphabet) 0-9 (all numbers) V+two characters that are in the base64 character set.

Another example attention rule is:

(pwd|pass(wd|word|phrase))

This rule will hit on anything that has "pwd", "pass", "passwd", "password", "passphrase". This attention rule would generate an enormous amount of false positives if used only like that since, for example, "pwd" may also stand for "present working directory,", etc.

Hardware Environment

Figure 7:
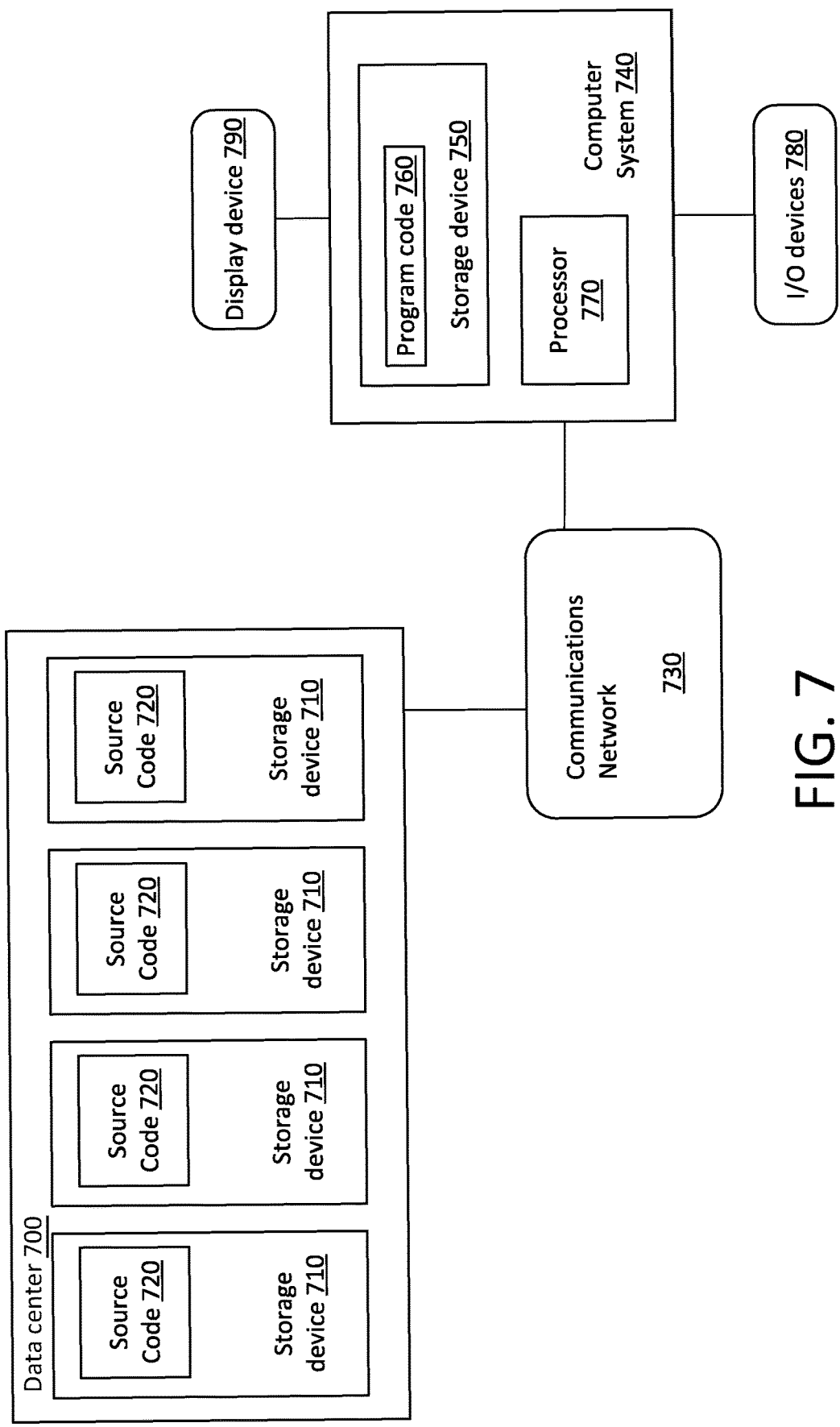
FIG. 7 depicts a hardware environment in which embodiments of the present invention may be implemented.

FIG. 7 shows an example hardware environment in which the method described with regard to FIG. 1 can be implemented. A datacenter 700 contains several storage devices 710 on which a source code 720 is stored. The datacenter 700 is connected via a communications network 730 (e.g. the Internet) with a computer system 740 having a storage device 750, including e.g. a computer-readable medium (ROM, RAM, EPROM, Flash memory), on which a program code 760 resides which includes instructions that cause a processor 770 to perform the method described with regard to FIG. 1. The dataset can be transmitted via the communications network 730 in form of a stream to computer system 740 on which the method described with regard to FIG. 6 is performed. The computer system 740 further has one or more I/O devices 780 such as keyboard, mouse, etc. and further has a display device 790 on which the results of the method, i.e. the found passwords, can be presented to the user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject-matter may be embodied as a system, method or computer program product. Accordingly, the disclosed subject-matter may take the form of an entirely hardware embodiment, and entirely software embodiment (including firmware, resident software, micro-code, etc.) or an embodiment combining software and hardware aspects that may all generally be referred to herein as a "circuit", "module" or "system". Furthermore, the present invention may take the form of a computer program (product) embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically capture, via, for instance, optical scanning of the paper or other medium, the compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The disclosed subject matter is described above with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention claimed is:

1. An order independent computer-implemented method of auditing a large-scale dataset for sensitive data, the method comprising:
   receiving content from a real-time dataset of a live service environment;

identifying data snippets of the real-time dataset using a set of one or more attention rules, wherein the one or more attention rules are opportunistic attention rules configured for maximising a recall rate, and each identified data snippet includes either a true positive data item or a false positive data item, wherein a true positive data item is a data item that matches one or more defined criteria associated with sensitive data, and a false positive data item is a data item that does not match the one or more defined criteria associated with sensitive data, wherein the recall rate indicates a portion of identified true positive data items that match the one or more defined criteria associated with sensitive data among true positive data items present in the received content;

categorizing the identified data snippets using fuzzy hashing by assigning them to buckets such that each bucket contains data snippets that are similar to one another according to a similarity measure defined by a fuzzy hashing algorithm for performing the fuzzy hashing;

classifying buckets containing data snippets having more than a threshold number of the true positive data items as true positive buckets and remaining buckets as false positive buckets;

calculating culling rules based on the true positive buckets and the false positive buckets, wherein the culling rules are configured to reduce a total number of false positive data items in the true positive buckets to increase a precision rate; and using the culling rules to remove the false positive data items that do not meet the one or more defined criteria associated with sensitive data from the true positive buckets, to increase the precision rate that corresponds to a portion of true positive data items that meet the one or more defined criteria associated with sensitive data among data items in the true positive buckets.

2. The computer-implemented method of claim 1, wherein the one or more defined criteria comprises sensitivity of information.

3. The computer-implemented method of claim 1, comprising receiving the real-time dataset in a form of a stream.

4. The computer-implemented method of claim 1, wherein the fuzzy hashing is performed using SSDeep, SDHash, Nilsimsa or TLSH.

5. The computer-implemented method of claim 4, wherein two data snippets are considered to be similar and assigned to the same bucket if a comparison score above a threshold has been calculated for the two data snippets.

6. The computer-implemented method of claim 1, wherein the set of one or more attention rules are adapted over time.

7. A non-transitory computer-readable medium comprising computer executable instructions stored thereon which, when executed by one or more processors cause the processors to: perform an auditing method of finding one or more data items that match one or more defined criteria associated with sensitive data in a large-scale dataset, the method comprising:

identifying data snippets of the dataset using a set of one or more attention rules, wherein the one or more attention rules are opportunistic attention rules configured for maximising a recall rate, and each identified data snippet includes either a true positive data item or a false positive data item, wherein a true positive data item is a data item that matches the one or more defined criteria associated with sensitive data, and a false positive data item is a data item that does not match the one or more defined criteria associated with sensitive data, wherein the recall rate indicates a portion of identified true positive data items that match the one or more defined criteria associated with sensitive data among true positive data items present in content of the dataset;

categorizing the identified data snippets using fuzzy hashing by assigning them to buckets such that each bucket contains the data snippets that are similar to another according to a similarity measure defined by a fuzzy hashing algorithm for performing the fuzzy hashing;

classifying the buckets containing data snippets having more than a threshold number of the true positive data items as true positive buckets and remaining buckets as false positive buckets;

calculating culling rules based on the true positive buckets and the false positive buckets, wherein the culling rules are configured to reduce a total number of false positive data items in the true positive buckets to increase a precision rate; and using the culling rules to remove the false positive data items that do not meet the one or more defined criteria associated with sensitive data from the true positive buckets, to increase the precision rate that corresponds to a portion of true positive data items that meet the one or more defined criteria associated with sensitive data among data items in the true positive buckets.

8. The non-transitory computer-readable medium of claim 7, wherein the culling rules are calculated in such a way that the recall rate is maximised while also keeping the precision rate as high as possible.

9. The non-transitory computer-readable medium of claim 7, wherein the culling rules are calculated such that a minimum set of culling rules maximises an amount of culling done on the true positive buckets.

10. The non-transitory computer-readable medium of claim 7, wherein the culling rules are calculated by calculating a subset of features that are present in all data snippets of the false positive buckets but are not present in the true positive buckets.

11. The non-transitory computer-readable medium of claim 7, wherein the culling rules are considered to be precise.

12. The non-transitory computer-readable medium of claim 7, wherein the culling rules are recalculated at a point of time that is determined using a Fast Fourier Transformation.

13. The non-transitory computer-readable medium of claim 7, wherein the culling rules are recalculated at a point of time that is determined by ratio of new data added to all data known.

14. A computer system, comprising
one or more processors;
one or more non-transitory computer-readable media having computer-executable instructions stored on the one or more processors, wherein the one or more computer-executable instructions are configured to cause the one or more processors to perform an auditing method of finding one or more data items that match one or more defined criteria associated with sensitive data in a large-scale dataset, the method comprising:

identifying data snippets of the dataset using a set of one or more attention rules, wherein the one or more attention rules are opportunistic attention rules configured for maximising a recall rate, and each identified data snippet includes either a true positive data item or a false positive data item, wherein a true positive data item is a data item that matches one or more defined criteria associated with sensitive data, and a false positive data item is a data item that does not match the one or more defined criteria associated with sensitive data, wherein the recall rate indicates a portion of identified true positive data items that match the one or more defined criteria associated with sensitive data among true positive data items present in content of the dataset;

categorizing the identified data snippets using fuzzy hashing by assigning them to buckets such that each bucket contains data snippets that are similar to another according to a similarity measure defined by a fuzzy hashing algorithm for performing the fuzzy hashing;

classifying the buckets containing data snippets having more than a threshold number of true positive data items as true positive buckets and remaining buckets as false positive buckets;

calculating culling rules based on the true positive buckets and the false positive buckets, wherein the culling rules are configured to reduce a total number of false positive data items in the true positive buckets to increase a precision rate; and using the culling rules to remove the false positive data items that do not meet the one or more defined criteria associated with sensitive data from the true positive buckets, to increase the precision rate that corresponds to a portion of true positive data items that meet the one or more defined criteria associated with sensitive data among data items in the true positive buckets.

15. The computer system of claim 14, wherein the set of one or more attention rules and the culling rules are implemented in a form of regular expression filtering.

16. The computer system of claim 14, wherein context of a data item is defined by features in a vicinity of the data item.

17. The computer system of claim 14, wherein the step of classifying the buckets as false positive buckets and true positive buckets is done either manually by a user visually assessing the content of the buckets or automatically by a machine.

18. The computer system of claim 14, wherein the method is repeated at least 20 times to yield a required recall rate and precision rate.

19. The computer system of claim 14, wherein the method is repeated until all data snippets containing data items have been correctly assigned to true positive buckets.

* * * * *

UNITED STATES PATENT AND TRADEMARK OFFICE
CERTIFICATE OF CORRECTION

PATENT NO. : 11,789,982 B2
APPLICATION NO. : 17/029524
DATED : October 17, 2023
INVENTOR(S) : Denis Tumpic et al.

Page 1 of 1

It is certified that error appears in the above-identified patent and that said Letters Patent is hereby corrected as shown below:

In the Specification

In Column 10, Line 39, delete "(>|'|=")" and insert -- (>|'|=|") --, therefor.

Signed and Sealed this
Twenty-sixth Day of December, 2023

Katherine Kelly Vidal
*Director of the United States Patent and Trademark Office*